US005963665A

United States Patent [19]
Kim et al.

[11] Patent Number: 5,963,665
[45] Date of Patent: Oct. 5, 1999

[54] IMAGE ENHANCING METHOD USING MEAN-SEPARATE HISTOGRAM EQUALIZATION AND A CIRCUIT THEREFOR

[75] Inventors: Young-taek Kim, Suwon; Yong-hun Cho, Seoul, both of Rep. of Korea

[73] Assignee: Samsung Electronics Co., Ltd., Kyungki-Do, Rep. of Korea

[21] Appl. No.: 08/813,425

[22] Filed: Mar. 10, 1997

[30] Foreign Application Priority Data

Mar. 9, 1996 [KR] Rep. of Korea ......................... 96-6219
Apr. 17, 1996 [KR] Rep. of Korea ....................... 96-11624

[51] Int. Cl.$^6$ ............................... G06K 9/38; G06T 5/40
[52] U.S. Cl. ........................ 382/169; 382/171; 382/271; 382/273; 382/274; 382/282; 348/254; 348/672; 348/673; 358/455; 358/522; 358/532
[58] Field of Search ................................... 382/171, 169, 382/172, 271, 272, 274, 286, 288, 303, 307, 167, 168, 170, 173, 282, 304; 348/672, 625, 254, 673; 358/522, 443, 448, 450, 453, 455, 521, 524, 530, 532, 540

[56] References Cited

U.S. PATENT DOCUMENTS

| | | | |
|---|---|---|---|
| 4,682,229 | 7/1987 | Coates et al. | 348/672 |
| 4,745,465 | 5/1988 | Kwon | 358/522 |
| 4,912,659 | 3/1990 | Liang | 345/434 |
| 4,952,805 | 8/1990 | Tanaka | 250/586 |
| 5,214,711 | 5/1993 | Neely et al. | 382/107 |
| 5,410,618 | 4/1995 | Fowler | 382/254 |
| 5,426,517 | 6/1995 | Schwartz | 358/520 |
| 5,450,502 | 9/1995 | Eschbach et al. | 382/169 |
| 5,475,507 | 12/1995 | Suzuki et al. | 358/500 |
| 5,598,217 | 1/1997 | Yamaguchi | 348/424 |
| 5,614,948 | 3/1997 | Hannah | 348/255 |
| 5,668,737 | 9/1997 | Iler | 395/800.01 |
| 5,734,746 | 3/1998 | Jaspers | 382/169 |
| 5,808,697 | 9/1998 | Fujimura et al. | 348/672 |

OTHER PUBLICATIONS

J.S. Lim, "Two–dimensional Signal and Image Processing," Prentice Hall, Englewood Cliffs, New Jersey, 1990.
R.C. Gonzalez and P. Wints, "Digital Image Processing," Addison–Wesley, Reading, Massachusetts, 1977.
J. Zimmerman, S. Pizer, E. Staab, E. Perry, W. McCartney and B. Brenton, "Evaluation of the Effectiveness of Adaptive Histogram Equalization for Contrast Enhancement," IEEE Tr. on Medical Imaging, pp. 304–312, Dec. 1988.
Y. Li, W. Wang and D.Y. Yu, "Application of Adaptive Histogram Equalization to X–ray Chest Image," Proc. of the SPIE, pp. 513–514, vol. 2321, 1994.
Russ, John C., "Image Processing Handbook", 1995, pp. 216–224.

*Primary Examiner*—Edward L. Coles
*Assistant Examiner*—David Rosenblum
*Attorney, Agent, or Firm*—Sugurue, Mion, Zinn, Macpeak & Seas, PLLC

[57] ABSTRACT

An image enhancing method using a mean-separate histogram equalization method is disclosed. An input image signal is divided into two sub-images in a picture unit according to a mean level of the input image signal. Then, cumulative density functions for each of the sub-images are calculated. Afterwards, the input sample is mapped into two gray levels, each of which belongs to a first range and a second range, by using first and second transform functions defined by use of the cumulative density functions, respectively. Finally, one of two mapped levels is selected depending on the magnitude of the input sample. As a result, the brightness of the given image can be preserved while the contrast is enhanced.

45 Claims, 5 Drawing Sheets

IMAGE ENHANCING METHOD USING MEAN-SEPARATE HISTOGRAM EQUALIZATION AND A CIRCUIT THEREFOR

BACKGROUND OF THE INVENTION

1. Field of the Invention

The present invention relates to an image enhancing method using mean-separate histogram equalization (MSHE) and a circuit therefor. More particularly, the present invention relates to an image enhancing method in which a given image is separated into a predetermined number of sub-images based on a mean level of the image and the respective sub-images are histogram-equalized independently, and a circuit therefor.

The instant application is based on Korean Patent Application Nos. 96-6219 and 96-11624 which are incorporated herein by reference for all purposes.

2. Description of the Related Art

A histogram of gray levels provides an overall description of the appearance of an image. Properly adjusted gray levels for a given image can enhance the appearance or contrast thereof.

Among the many methods for contrast enhancement, the most widely known one is histogram equalization, in which the contrast of a given image is enhanced according to the sample distribution thereof. Such a method is disclosed in the documents: [1] J. S. Lim, "Two-dimensional Signal and Image Processing," Prentice Hall, Englewood Cliffs, N.J., 1990, and [2] R. C. Gonzalez and P. Wints, "Digital Image Processing," Addison-Wesley, Reading, Mass., 1977.

Also, useful applications of the histogram equalization method for medical image processing and radar image processing are disclosed in the following documents: [3] J. Zimmerman, S. Pizer, E. Staab, E. Perry, W. McCartney and B. Brenton, "Evaluation of the Effectiveness of Adaptive Histogram Equalization for Contrast Enhancement," IEEE Tr. on Medical Imaging, pp. 304–312, December 1988, and [4] Y. Li, W. Wang and D. Y. Yu, "Application of Adaptive Histogram Equalization to X-ray Chest Image," Proc. of the SPIE, pp. 513–514, vol. 2321, 1994.

In general, since histogram equalization causes the dynamic range of an image to be stretched, the density distribution of the resultant image is made flat and the contrast of the image is enhanced as a consequence thereof.

However, this widely-known technique of histogram equalization can cause problems in some practical cases. That is, as the output density of the histogram equalization becomes uniform, the mean brightness of an output image approaches the middle gray level value. Actually, for histogram equalization of an analog image, the mean brightness of the output image is exactly the middle gray level regardless of the mean brightness of the input image. Obviously this feature is not desirable in an some real applications. For instance, an image taken at nighttime can appear to be an image taken in the daytime after histogram equalization has been performed. Meanwhile, image signals which are too dark or too bright result in low contrast after equalization.

SUMMARY OF THE INVENTION

To solve the above problems, it is an object of the present invention to provide an image enhancing method in which a given image is separated into predetermined number of sub-images based on a mean level of the image and the respective sub-images are independently histogram-equalized, so that the mean brightness of the given image is preserved while the contrast of the image is enhanced.

It is another object of the present invention to provide an image enhancing method in which an input image is separated into a predetermined number of sub-images based on a mean level of the image and the respective sub-images are independently histogram-equalized according to a gray level distribution of the sub-image and a compensated mean level which results from adding a brightness compensation value to the mean level.

It is yet another object of the present invention to provide an image enhancing method by which a given image is separated into a predetermined number of sub-images based on a mean level of the image and the respective sub-images are independently histogram-equalized, so that the mean brightness of the given image is preserved while the contrast of the image is enhanced.

It is still yet another object of the present invention to provide an image enhancing circuit by which an input image is separated into a predetermined number of sub-images based on a mean level of the image and the respective sub-images are independently histogram-equalized according to a gray level distribution of the sub-image and a compensated mean level which results from adding a brightness compensation value to the mean level.

To achieve one of the objects above, there is provided a method for enhancing an image by histogram-equalizing an input image signal represented by a predetermined number of gray levels, the method comprising: calculating a mean level of the input image signal of a picture unit; diving the input image signal of the picture unit into a predetermined number of sub-images according to the mean level; calculating a cumulative density function for each sub-image; and histogram-equalizing each sub-image independent of the other sub-images by mapping an input sample of the sub-image into a new gray level based on the cumulative density functions.

To achieve another one of the objects above, there is provided a method for enhancing an image by histogram-equalizing an input image signal represented by a predetermined number of gray levels, the method comprising: calculating a mean level in a picture unit of the input image signal; obtaining a gray level distribution in the picture unit of the input image signal; dividing the gray level distribution into a predetermined number of sub-images; calculating a cumulative density function for each sub-image based on the gray level distribution; and obtaining a compensated mean level by adding to the mean level a brightness compensation value determined according to a predetermined correction function based on a mean brightness of the input image signal; and histogram-equalizing each sub-image independent of one another by mapping an input sample of the sub-image into a new gray level based on the cumulative density function and the compensated mean level.

To achieve yet another one of the objects above, there is provided a circuit for enhancing an image by histogram-equalizing an image signal represented by a predetermined number of gray levels in a picture unit, the circuit comprising: first calculating means for calculating a gray level distribution of the image signal; second calculating means for calculating a mean level of the image signal; third calculating means for dividing the gray level distribution into a predetermined number of sub-images based on the mean level and calculating a cumulative density function for each sub-image; a picture memory for storing samples of the image signal and providing an input sample delayed by a picture unit; mapping means for mapping the input sample output by the picture memory into mapped gray levels based on the sub-images and the cumulative density functions, and outputting the mapped gray levels; and outputting means for comparing the input sample with the mean level, selecting one of the mapped gray levels output by the mapping means and outputting the selected level.

To achieve still yet another one of the objects above, there is provided a circuit for enhancing an image by histogram-equalizing an image signal represented by a predetermined number of gray levels in a picture unit, the circuit comprising: first calculating means for calculating a gray level distribution of the image signal; second calculating means for calculating a mean level of the image signal; compensation means for calculating a compensated mean level by adding a brightness compensation value according to a predetermined correction function to the mean level based on the mean brightness of the input image; third calculating means for dividing the gray level distribution into a predetermined number of sub-images based on the mean level and calculating a cumulative density function for each sub-image; a picture memory for delaying the image signal by a picture unit and providing an input sample; mapping means for mapping the input sample output by the picture memory into mapped gray levels based on the sub-images, the cumulative density functions and the compensated mean level, and outputting the mapped gray levels; and outputting means for comparing the input sample with the mean level and selecting one of the mapped gray levels output by the mapping means and outputting the selected level.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
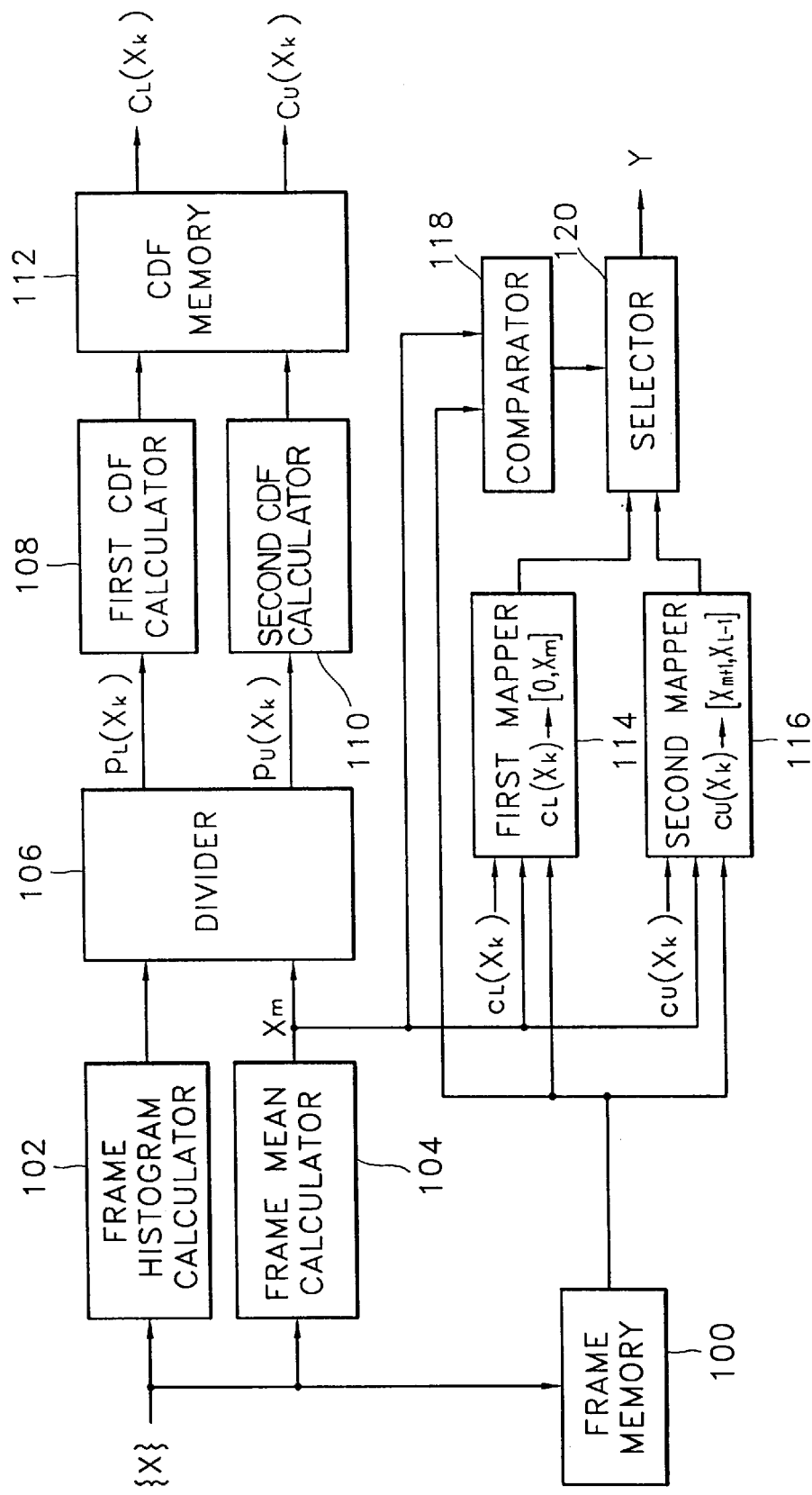
FIG. 1 is a block diagram of an image enhancing circuit according to a first embodiment of the present invention.

Preferred embodiments of an image enhancing method and apparatus according to the present invention is described below in detail with reference to the accompanying drawings.

An image enhancing method using mean-separate histogram equalization (MSHE) according to the present invention will be described.

Here $\{X\}$ denotes a given image, and $X_m$ denotes the mean brightness level (hereinafter, abbreviated as "mean level") of $\{X\}$. The given image $\{X\}$ is composed of L discrete gray levels denoted by $\{X_0, X_1, \ldots, X_{L-1}\}$, where $X_0=0$ represents a block level and $X_{L-1}=1$ represents a while level. Also, it is assumed that $X_m \in \{X_0, X_1, \ldots, X_{L-1}\}$.

Based on the mean level $X_m$, the input image is divided into two sub-image groups denoted by $\{X\}_L$ and $\{X\}_U$, wherein all the samples in $\{X\}_L$ are equal to or less than the mean level $X_m$ and those in $\{X\}_U$ are greater than the mean level $X_m$.

Probability density functions (PDFs) for each of the sub-images $\{X\}_L$ and $\{X\}_U$ are defined, respectively, by the following equations (1) and (2).

$$p_L(X_k) = \frac{n_k^L}{n_L}, \quad \text{for } k = 0, 1, \ldots, m \tag{1}$$

$$p_U(X_k) = \frac{n_k^U}{n_U}, \quad \text{for } k = m+1, m+2, \ldots, L-1 \tag{2}$$

where, L represents the number of gray levels, $p_L(X_k)$ represents a probability of a k-th gray level $X_k$ occurring in the sub-image $\{X\}_L$, $P_U(X_k)$ represents a probability of a k-th gray level $X_k$ occurring in the sub-image $\{X\}_U$, $n_k^L$ and $n_k^U$ represent the number of occurrences of samples having the gray level $X_k$ in the sub-images $\{X\}_L$ and $\{X\}_U$, respectively, and $n_L$ and $n_U$ represent the total number of samples in each of the sub-images $\{X\}_L$ and $\{X\}_U$.

Also, cumulative density functions (CDF) for each of the sub-images $\{X\}_L$ and $\{X\}_U$ are defined, respectively, by the following equations (3) and (4).

$$c_L(X_k) = \sum_{j=0}^{k} p_L(X_j), \quad \text{for } k = 0, 1, 2, \ldots, m \tag{3}$$

$$c_U(X_k) = \sum_{j=m+1}^{k} p_U(X_j), \quad \text{for } k = m+1, m+2, \ldots, L-1 \tag{4}$$

Based on the above CDFs, an output $Y_H$ of the proposed MSHE of the present invention, for the input sample $X_k$, is given by the following equation (5).

$$Y = \begin{cases} c_L(X_k) X_m & \text{if } X_k \leq X_m \\ X_{m+1} + (X_{L-1} - X_{m+1}) c_U(X_k) & \text{if } X_k > X_m \end{cases} \tag{5}$$

That is, the samples of $\{X\}_L$ are mapped into $(0, X_m)$ according to the CDF of equation (3), and the samples of $\{X\}_U$ are mapped into $(X_{m+1}, X_{L-1})$, respectively. Thus, each sub-image is equalized independently by the mean-separate histogram equalization (MSHE) according to the present invention.

Also, it can easily be seen that the average output of the mean-separate histogram equalization (MSHE) is given by $(0.5+X_m)/2$ when the number of gray levels L are large enough and the PDF of the input image X is symmetrical about the mean level of the input image. That is, the average output of the proposed mean-separate algorithm is the arithmetical average of the middle gray level (0.5) and ideal mean level (0.5), while the average output of the conventional histogram is 0.5.

In another image enhancement method according to the present invention, which carries out brightness compensation along with contrast enhancement, an output $Y_H$ of the proposed MSHE is defined by the following formula (6) for a input sample $X_k$.

$$Y_H = \begin{cases} c_L(X_k)B_m & \text{if } X_k \leq X_m \\ B_{m+1}' + (X_{L-1} - B_m')c_U(X_k) & \text{if } X_k > X_m \end{cases} \quad (6)$$

where, $$B_m = X_m + \Delta \quad (7)$$

Here, $B_m$ is a compensated mean level and $\Delta$ is a brightness compensation value which is preset by use of a predetermined compensation function according to the brightness level. Thus, the compensated mean level $B_m$ results from adding the brightness compensation value $\Delta$ to the mean level $X_m$. At this time, it is also assumed that $B_m \in \{X_0, X_1, \ldots, X_{L-1}\}$.

Meanwhile, $B_m'$ in equation (6) is defined by the following equation (8)

$$B_m' = B_m + X_{L-1}/(L-1) \quad (8)$$

and represents the first gray level in the higher sub-image group, or in other words, the gray level next to the compensated mean level $B_m$.

As a consequence, according to equation (6), the input samples which are equal to or less than the mean level $X_m$ are mapped into a gray level of from 0 to $B_m$ (0, $B_m$), and the samples greater than the mean level $X_m$ are mapped into a gray level of from $B_m'$ to $X_{L-1}$ ($B_m'$, $X_{L-1}$).

Thus, the equalized output $Y_H$ becomes brighter when the brightness compensation value is greater than 0 ($\Delta>0$), and the equalized output $Y_H$ becomes darker when the brightness compensation value is less than 0 ($\Delta<0$). As $\Delta$ is increased the dynamic range of a lower portion of the image is enhanced, and as $\Delta$ is decreased the dynamic range of an upper portion is enhanced. The compensated mean level $B_m$ appropriately compensated according the mean level $X_m$ of the given image signal, that is, the brightness and darkness of the image, greatly enhances the quality of the input image along with the mean separate histogram equalization.

Next, preferred embodiments of an image enhancing circuit according to the present invention using MSHE will be described with reference to FIGS. 1 to 6.

FIG. 1 is a block diagram of an image enhancing circuit according to a preferred embodiment of the present invention.

In FIG. 1, a frame histogram calculator 102 calculates the probability density function $p(X_k)$ which represents a gray level distribution in the input image $\{X\}$ according to equation (1), in units of a picture. At this stage, a frame is used for the picture unit. Alternatively, a field may be used for the picture unit.

A frame mean calculator 104 calculates the mean level $X_m$ of the input image $\{X_k\}$ for a frame unit.

A divider 106 divides the gray level distribution calculated by histogram calculator 102 into a predetermined number (e.g., two) of sub-image distributions based on the mean level $X_m$, and outputs the probability density functions $p_L(X_k)$ and $p_U(X_k)$ of two sub-images $\{X\}_L$ and $\{X\}_U$.

A first CDF calculator 108 receives the probability density function $p_L(X_k)$ of the sub-image $\{X\}_L$ (hereinafter, referred to as a "first sub-image"), in which all image samples are equal to or less than the mean level $X_m$, output by divider 106, and calculates the CDF $c_L(X_k)$ according to equation (3).

A second CDF calculator 110 receives the probability density function $p_U(X_k)$ of the sub-image $\{X\}_U$ (hereinafter, referred to as a "second sub-image"), in which all image samples are greater than the mean level $X_m$, output by the divider 106, and calculates the CDF $c_U(X_k)$ according to equation (4).

A CDF memory 112 stores the cumulative density function $c_L(X_k)$ and $c_U(X_k)$ calculated by CDF calculators 108 and 110 in units of a frame, updates the stored values according to a synchronization signal, and outputs the stored cumulative density function $C_L(X_k)$ and $C_U(X_k)$. That is, outputs of the CDF memory include the cumulative density function value $c(X_k)$ corresponding to a sample $X_k$ output by a frame memory 100 and the cumulative density function value $c(X_m)$ corresponding to the mean level $X_m$ output by the frame mean calculator 104. At this stage, the CDF memory 112 is used as a buffer. Here, the synchronous signal is a field synchronization signal when the picture unit is a field, and a frame synchronization signal when the picture unit is a frame.

The frame memory 100 stores the input image $\{X\}$ in units of a frame. Since the cumulative density functions $c_L(X_k)$ and $c_U(X_k)$ output by the first and second CDF calculators 108 and 110 are the cumulative density functions of an image delayed by one frame compared with the currently input image $\{X\}$, the input image $\{X\}$ is delayed by one frame by the frame memory 100 so that the image signal of the frame corresponding to the cumulative density functions $c_L(X_k)$ and $c_U(X_k)$ is input to first and second mappers 114 and 116.

The first mapper 114 receives the cumulative density function value $c_L(X_k)$ from the first CDF calculator 108, through the CDF memory 112 the mean level $X_m$ from the frame mean calculator 104 and the one-frame delayed input sample $X_k$ from the frame memory 100, and maps the one-frame delayed input sample $X_k$ of the first sub-image $\{X\}_L$ to a gray level ranging from 0 to $X_m$ according to the first expression in equation (5).

The second mapper 116 receives the cumulative density function value $c_U(X_k)$ from the second CDF calculator 110, through the CDF memory 112 the mean level $X_m$ from the frame mean calculator 104 and the one-frame delayed input sample $X_k$ from the frame memory 100, and maps the one-frame delayed input sample $X_k$ of the second sub-image $\{X\}_U$ to a gray level ranging from $X_{m+1}$ to $X_{L-1}$ according to the second expression in equation (5).

A comparator 118 compares the input sample $X_k$ output from frame memory 100 with the mean level $X_m$ output from frame mean calculator 104, and outputs a select control signal according to the compared result.

A selector 120 selects the signal output by the first mapper 114 or that output by the second mapper 116 in accordance with the selection control signal. Specifically, the selector 120 selects the signal output by the first mapper 114 in the case where the selection control signal indicates that the input sample $X_k$ belongs to the first sub-image $\{X\}_L$. Meanwhile, the selector 120 selects the signal output by the second mapper 116 in the case where the selection control signal indicates that the input sample $X_k$ belongs to the second sub-image $\{X\}_U$.

In the present invention, the histogram calculator 102 and the CDF calculator 104 can be incorporated into a single block for calculating the gray level distribution and calculating the CDF also according to the gray level distribution in a picture unit, with respect to the input image $\{X\}$.

Figure 2:
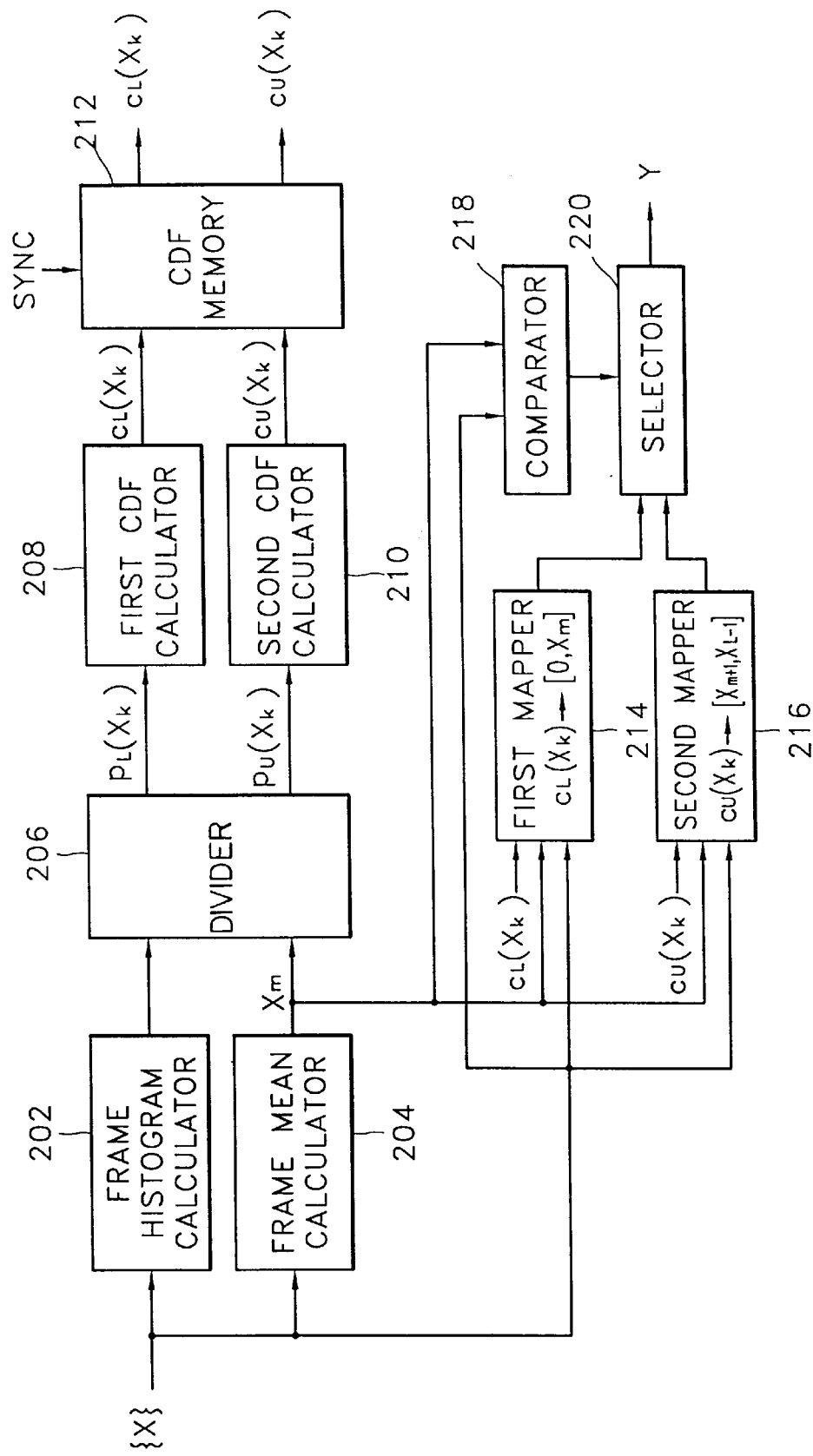
FIG. 2 is a block diagram of an image enhancing circuit according to a second embodiment of the present invention.

FIG. 2 is a block diagram of an image enhancing circuit according to another preferred embodiment of the present invention.

In FIG. 2, a frame histogram calculator 202 calculates the probability density function $p(X_k)$ which represents a gray level distribution in the input image {X} according to equation (1) in units of a picture.

A frame mean calculator 204 calculates the mean level $X_m$ of the input image $\{X_k\}$ in a frame unit.

A divider 206 divides the gray level distribution calculated by histogram calculator 202 into two sub-image distributions based on the mean level $X_m$, and outputs the probability density functions $p_L(X_k)$ and $p_U(X_k)$ of two sub-images $\{X\}_L$ and $\{X\}_U$.

A first CDF calculator 208 receives the probability density function $p_L(X_k)$ of the first sub-image $\{X\}_L$, and calculates the CDF $c_L(X_k)$ according to equation (3).

A second CDF calculator 210 receives the probability density function $p_U(X_k)$ of the second sub-image $\{X\}_U$, and calculates the CDF $c_U(X_k)$ according to equation (4).

A CDF memory 212 stores the cumulative density functions $c_L(X_k)$ and $c_U(X_k)$ calculated by the CDF calculators 208 and 210 in units of one frame, updates the stored values according to a synchronization signal SYNC, and outputs the stored cumulative density functions $C_L(X_k)$ and $C_U(X_k)$. That is, outputs of the CDF memory 212 include; and the cumulative density function value $c(X_k)$ corresponding to a sample $X_k$ and the cumulative density function value $c(X_m)$ corresponding to the mean level $X_m$ output by the frame mean calculator 204.

The first mapper 214 receives the cumulative density function value $c_L(X_k)$ from the first CDF calculator 208, through the CDF memory 212 the mean level $X_m$ from the frame mean calculator 204 and the input sample $X_k$, and maps the input sample $X_k$ of the first sub-image $\{X\}_L$ to a gray level ranging from 0 to $X_m$ according to the first expression in equation (5).

The second mapper 216 receives the cumulative density function value $c_U(X_k)$ from the second CDF calculator 210, through the CDF memory 212 the mean level $X_m$ from the frame mean calculator 204 and the input sample $X_k$, and maps the input sample $X_k$ of the second sub-image $\{X\}_U$ to a gray level ranging from $X_{m+1}$ to $X_{L-1}$ according to the second expression in equation (5).

A comparator 218 compares the input sample $X_k$ with the mean level $X_m$ output from frame mean calculator 204, and outputs a select control signal according to the compared result.

A selector 220 selects the signal output by the first mapper 214 or that by the second mapper 216 in accordance with the selection control signal. Specifically, the selector 220 selects the signal output by the first mapper 214 in the case where the selection control signal indicates that the input sample $X_k$ belongs to the first sub-image $\{X\}_L$. On the other hand, the selector 220 selects the signal output by the second mapper 216 in the case where the selection control signal indicates that the input sample $X_k$ belongs to the second sub-image $\{X\}_U$.

In the embodiment of FIG. 2, a frame memory has been omitted, compared with the first embodiment of the present invention of FIG. 1, considering the feature that there exists a high correlation between neighboring frames. Thus, the sample $X_k$ input to the first and the second mappers 214 and 216 belongs to a frame adjacent to the one to which the output signals of the CDF memory 212 are related. Consequently, the hardware is reduced.

Figure 3:
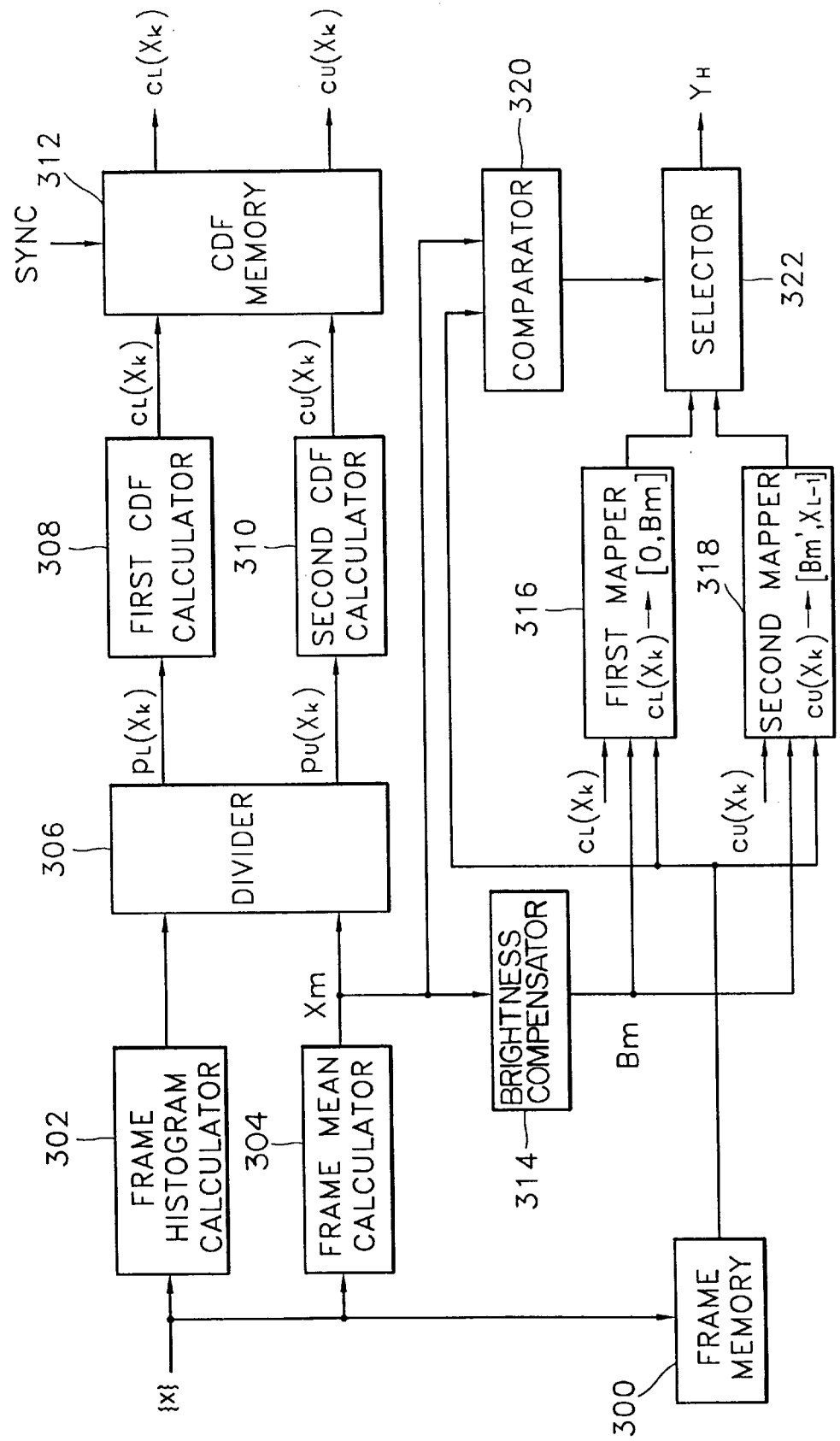
FIG. 3 is a block diagram of an image enhancing circuit according to a third embodiment of the present invention.

FIG. 3 is a block diagram of an image enhancing circuit according to yet another preferred embodiment of the present invention. The components of the circuit shown in FIG. 3 are similar to the those of the circuit shown in FIG. 1 except for a brightness compensator 314, and first and second mappers 316 and 318. Thus, the description of the this embodiment of the present invention will focus on the brightness compensator 314, and the first and the second mappers 316 and 318.

In FIG. 3, the brightness compensator 314 receives the mean level $X_m$ output by a frame mean calculator 304, adds a brightness compensation value (Δ) corresponding to the mean brightness of an input image, as described in equation (7), and outputs the compensated mean level $B_m$.

Figure 4A:
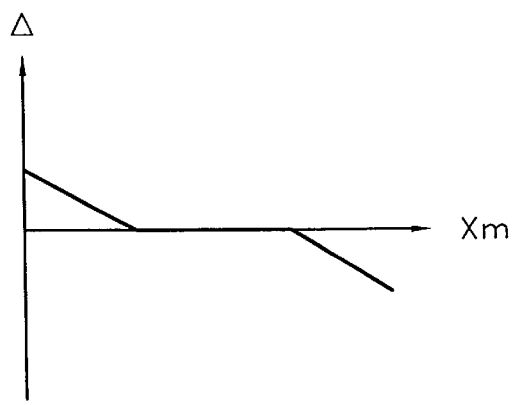
FIGS. 4A and 4B are graphs showing examples of a brightness correction function applied to the present invention.
Figure 4B:
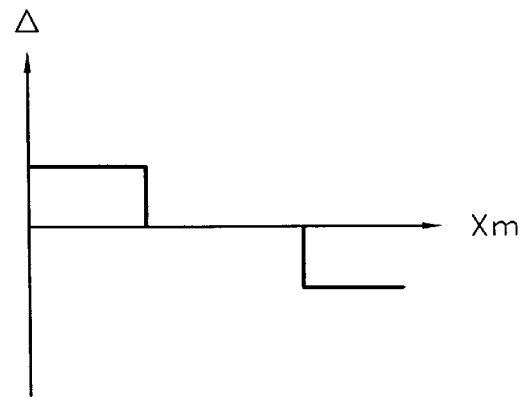

The brightness compensation value Δ is determined by use of a predetermined compensation function such as the ones shown in FIGS. 4A and 4B. However, the compensation functions shown in FIGS. 4A and 4B are only exemplary ones, and other compensation functions having different waveform shapes can be used as well.

The brightness of the equalized output is controlled by the brightness compensation value according to the compensation functions as shown in FIGS. 4A and 4B. Specifically, when the mean level $X_m$ of the input image is very low, i.e., for a rather dark image, the equalized output becomes brighter by the mean-matching histogram equalization method of the present invention, since a brightness compensation value Δ greater than "0" is added to the mean level $X_m$.

Meanwhile, when the mean level $X_m$ of the input image is very high, i.e., for a rather bright image, the equalized output becomes darker by the mean-matching histogram equalization method of the present invention, since a brightness compensation value Δ less than "0" is added to the mean level $X_m$. Accordingly, the compensated mean level $B_m$, compensated by a suitable brightness compensation value Δ according to the mean level $X_m$, drastically improves the quality of the input image.

Figure 5A:
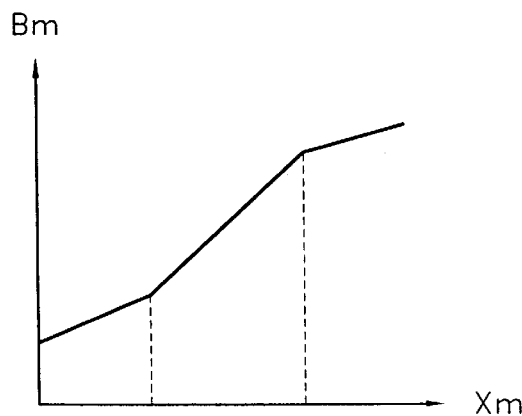
FIGS. 5A and 5B are graphs showing examples of the relation between the mean level of an input image and the mean level compensated by the brightness correction functions shown in FIGS. 4A and 4B, respectively.
Figure 5B:
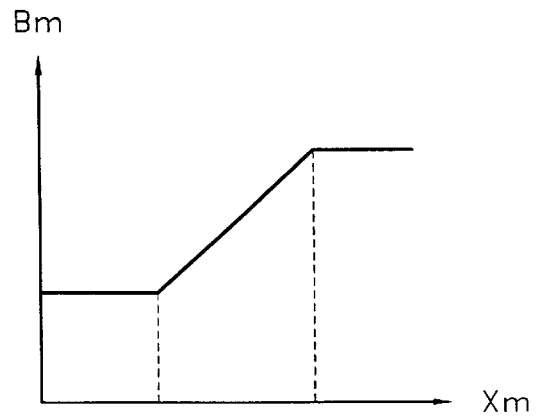

FIGS. 5A and 5B show the relation between the compensated mean level $B_m$, compensated by a compensated brightness compensation value Δ in accordance with the brightness compensation function shown in FIGS. 4A and 4B, and the mean level $X_m$ of the input image.

Meanwhile, the first mapper 316 receives the cumulative density function value $c_L(X_k)$ from the first CDF calculator 308, through the CDF memory 312 the compensated mean level $B_m$ from the bright compensator 314 and the one-frame delayed input sample $X_k$ from the frame memory 300. First mapper 316 maps the one-frame delayed input sample $X_k$ of the first sub-image $\{X\}_L$ to a gray level ranging from 0 to $B_m$ according to the first expression in equation (6).

The second mapper 318 receives the cumulative density function value $c_U(X_k)$ from the second CDF calculator 310, through the CDF memory 312 the compensated mean level $B_m$ from the bright compensator 314 and the one-frame delayed input sample $X_k$ from the frame memory 300. Second mapper 318 maps the one-frame delayed input sample $X_k$ of the second sub-image $\{X\}_U$ to a gray level ranging from $B_m'$ to $X_{L-1}$ according to the second expression in equation (6). Here, $B_m'$ is defined by equation (8).

Figure 6:
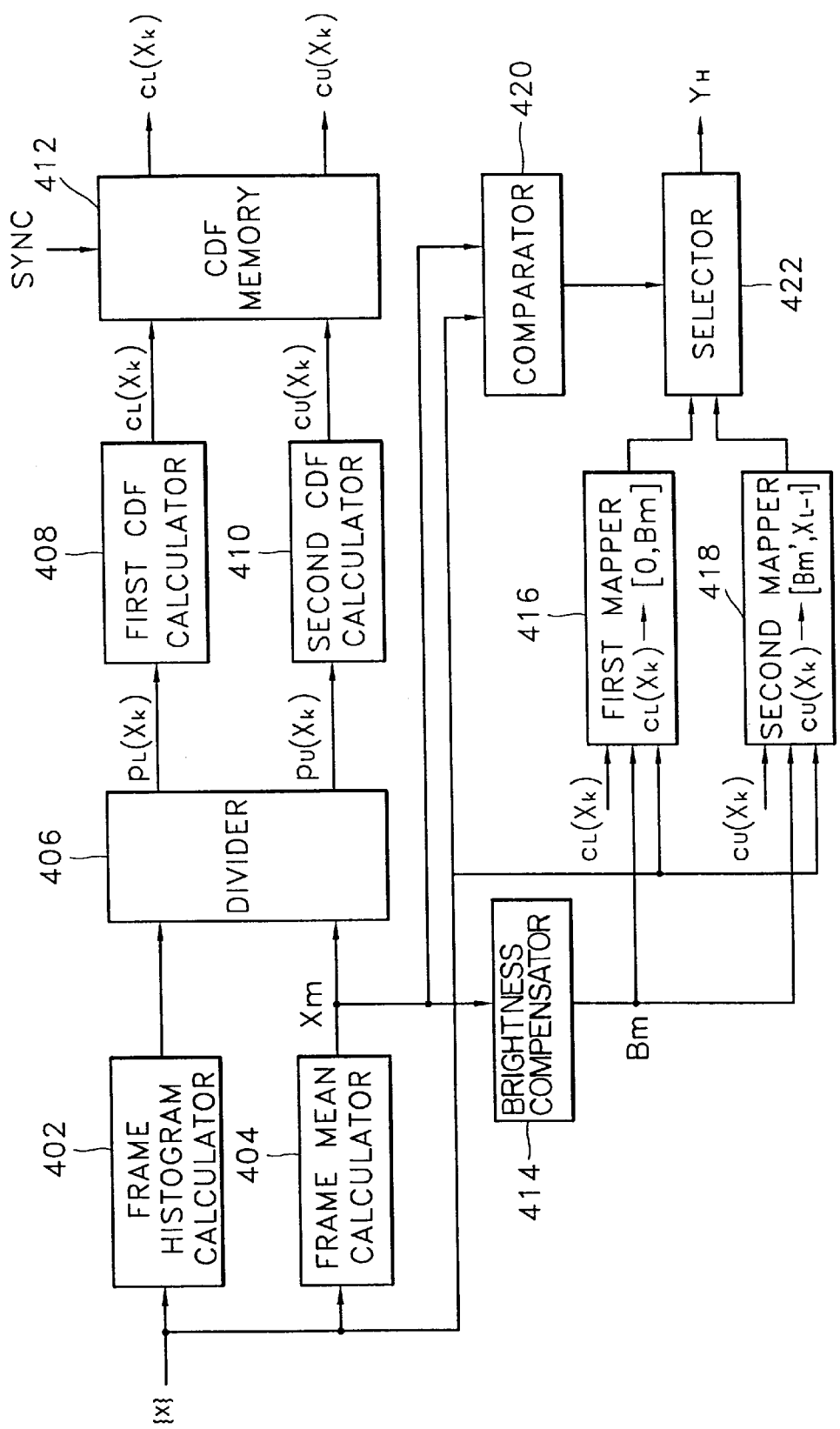
FIG. 6 is a block diagram of an image enhancing circuit according to a fourth embodiment of the present invention.

FIG. 6 is a block diagram of an image enhancing circuit according to still another preferred embodiment of the present invention. The components of the circuit shown in FIG. 6 are similar to the those of the circuit shown in FIG. 2, except for a brightness compensator 414, and first and second mappers 416 and 418. Thus, the description of this embodiment will focus on the brightness compensator 414, and the first and the second mappers 416 and 418.

In FIG. 6, the brightness compensator 414 receives the mean level $X_m$ output by a frame mean calculator 404, adds a brightness compensation value (Δ) corresponding to the mean brightness of an input image, as described in the equation (7), and outputs the compensated mean level $B_m$.

The first mapper 416 receives the cumulative density function value $c_L(X_k)$ from the first CDF calculator 408, through the CDF memory 412 the compensated mean level $B_m$ from the brightness compensator 414 and the input sample $X_k$. First mapper 416 maps the input sample $X_k$ of the first sub-image $\{X\}_L$ to a gray level ranging from 0 to $B_m$ according to the first expression in equation (6).

The second mapper 418 receives the cumulative density function value $c_U(X_k)$ from the second CDF calculator 410, through the CDF memory 412 the compensated mean level $B_m$ from the brightness compensator 414 and the input sample $X_k$. Second mapper maps the input sample $X_k$ of the second sub-image $\{X\}_U$ to a gray level ranging from $B_m'$ to $X_{L-1}$ according to the second expression in equation (6). Here, $B_m'$ is defined by equation (8).

As was the case for the image enhancing circuit of FIG. 2, the hardware is reduced by omitting the frame memory considering the situation that a high correlation exists between neighboring frames.

The image enhancing method using the MSHE and the circuit adopting the method effectively reduces abrupt changes in brightness as well as any artifact generated by the conventional histogram equalization, so that image contrast is enhanced and the brightness of the entire image can be preserved.

Also, according to the image enhancing method of the present invention and the circuit adopting the method, the MSHE is performed considering the brightness compensation value according to the mean brightness of the input image, so that the contrast of an input image signal which is excessively dark or bright is enhanced, and thereby image quality is improved.

Thus, the present invention can be applied to various fields related to image enhancing, such as broadcasting, radar signal processing, medical engineering and home appliances, etc.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for enhancing an image by histogram-equalizing an input image signal represented by a predetermined number of gray levels, said method comprising:

calculating a mean level of the input image;

grouping a plurality of pixels of said input image signal into a plurality of groups of image in accordance with the gray level of each of said pixels, wherein division of the input image signal into a plurality of groups of image occurs in accordance with the mean level;

calculating a cumulative density function for each group of image; and histogram-equalizing each group of image independent of the other groups of image by mapping an input sample of the group of image into a new gray level based on the cumulative density functions;

wherein the number of groups of images per each frame of the input image signal is predetermined to be two; and wherein said histogram-equalizing comprises:

mapping the input sample into a first gray level by using a first transform function, wherein the first transform function is based on one of the cumulative density functions and the first gray level is in a first range;

mapping the input sample into a second gray level by using a second transform function, wherein the second transform function is based on another of the cumulative density functions and the second gray level is in a second range;

comparing the input sample with the mean level; and selecting one of said first and second gray levels according to the comparison of he input sample with the mean level.

2. A method for enhancing an image by histogram-equalizing an input image signal represented by a predetermined number of gray levels, said method comprising:

calculating a mean level in a picture unit of the input image signal;

obtaining a gray level distribution in the picture unit of the input image signal;

dividing the gray level distribution into a predetermined number of sub-images;

calculating a cumulative density function for each sub-image based on the gray level distribution; and histogram-equalizing each sub-image independent of one another by mapping a sample of the sub-image into a new gray level based on the cumulative density functions.

3. A method for enhancing an image as claimed in claim 2, wherein the predetermined number of sub-images is two and the picture unit is a frame.

4. A method for enhancing an image as claimed in claim 3, wherein said histogram-equalizing comprises:

mapping the sample into a first gray level by using a first transform function which is defined by use of a first one of the cumulative density functions, wherein the first gray level is in a first range of gray levels;

mapping the sample into a second gray level by using a second transform function which is defined by use of a second one of the cumulative density functions, wherein the second gray level is in a second range of gray levels;

comparing the sample with the mean level; and selecting one of said first and second gray levels according to a result of comparing the sample with the mean level.

5. A method for enhancing an image as claimed in claim 4, wherein the first range of the gray levels comprises gray levels from a minimum gray level $X_0$ to a mean gray level $X_m$, and the second range comprises gray levels from a gray level $X_{m+1}$ adjacent to the mean level $X_m$ to a maximum level $X_{L-1}$.

6. A method for enhancing an image by histogram-equalizing an input image signal represented by a predetermined number of grays levels, said method comprising:

calculating a mean level in a picture unit of the input image signal;

obtaining a gray level distribution in the picture unit of the input image signal;

dividing the gray level distribution into a predetermined number of sub-images;

calculating a cumulative density function for each sub-image based on the gray level distribution; and obtaining a compensated mean level by adding to said mean level a brightness compensation value determined according to a predetermined correction function based on a mean brightness of the input image signal; and histogram-equalizing each sub-image independent of one another by mapping an input sample of the sub-image into a new gray level based on the cumulative density function and the compensated mean level.

7. A method for enhancing an image as claimed in claim 6, wherein the predetermined number of sub-images is two and the picture unit is a frame.

8. A method for enhancing an image as claimed in claim 7, wherein said histogram-equalizing comprises:

mapping the input sample to a gray level ranging from a minimum level $X_0$ to a compensated mean level $B_m$ according to a corresponding cumulative density function value of the input sample if the input sample is equal to or less than the mean level; and mapping the input image signal to a gray level ranging from a gray level $B_m'$ adjacent to $B_m$ to a maximum gray level $X_{L-1}$ according to a corresponding cumulative density function value of the input sample if the input sample is greater than the mean level, wherein $B_m'=B_m+X_{L-1}/(L-1)$ and L is the number of gray levels.

9. A method for enhancing an image as claimed in claim 6, wherein in obtaining a compensated mean value the brightness compensation value is greater than zero when the mean level is less than a first threshold, and the brightness compensation value is less than zero when the mean level is greater than a second threshold.

10. A circuit for enhancing an image by histogram-equalizing an image signal represented by a predetermined number of gray levels in a picture unit, said circuit comprising:

first calculating means for calculating a gray level distribution of the image signal;

second calculating means for calculating a mean level of the image signal;

third calculating means for dividing the gray level distribution into a predetermined number of sub-images based on the mean level and calculating a cumulative density function for each sub-image;

a picture memory for storing samples of the image signal and providing an input sample delayed by a picture unit;

mapping means for mapping the input sample output by said picture memory into mapped gray levels based on the sub-images and the cumulative density functions, and outputting the mapped gray levels; and outputting means for comparing the input sample with the mean level, selecting one of the mapped gray levels output by said mapping means and outputting the selected level.

11. A circuit for enhancing an image as claimed in claim 10, wherein the picture unit is a frame and the predetermined number is two.

12. A circuit for enhancing an image as claimed in claim 11, wherein said mapping means comprises:

a first mapper the input sample into a first gray level ranging from a minimum level $X_0$ to the mean level $X_m$ by using a first transform function which is defined based on one of the cumulative density functions; and a second mapper for mapping the input sample into a second gray level ranging from a level $X_{m+1}$ which is next to the mean level to a maximum level $X_{L-1}$ by using a second transform function which is defined based on another one of the cumulative density functions.

13. A circuit for enhancing an image as claimed in claim 12, wherein said outputting means comprises:

a comparator for comparing the mean level with the input sample from said picture memory and outputting a selection control signal; and a selector for selecting one of the first and second gray levels from said first and second mappers, respectively, according to the selection control signal.

14. A circuit for enhancing an image as claimed in claim 10, further comprising a buffer for storing the cumulative density functions calculated by said third calculating means, updating the stored cumulative density functions based on the picture unit, and providing a predetermined number of cumulative density function values to said mapping means.

15. A circuit for enhancing an image by histogram-equalizing an image signal represented by a predetermined number of gray levels in a picture unit, said circuit comprising:

first calculating means for calculating a gray level distribution of the image signal;

second calculating means for calculating a mean level of the image signal;

third calculating means for dividing the gray level distribution into a predetermined number of sub-images based on the mean level and calculating a cumulative density function for each sub-image;

mapping means for mapping an input sample of the image signal into mapped gray levels based on the sub-images and the cumulative density functions calculated for a picture just before a current picture, and outputting the mapped gray levels; and outputting means for comparing the input sample with the mean level, selecting one of the mapped gray levels output by said mapping means and outputting the selected gray level.

16. A circuit for enhancing an image as claimed in claim 15, wherein the picture unit is a frame and the predetermined number is two.

17. A circuit for enhancing an image as claimed in claim 16, wherein said mapping means comprises:

a first mapper for mapping the input sample into a first gray level ranging from a minimum level $X_0$ to the mean level $X_m$ by using a first transform function which is defined based on one of the cumulative density functions; and a second mapper for mapping the input sample into a second gray level ranging from a level $X_{m+1}$ which is next to the mean level to a maximum level $X_{L-1}$ by using a second transform which is defined based on another one of the cumulative density functions.

18. A circuit for enhancing an image as claimed in claim 17, wherein said outputting means comprises:

a comparator for comparing the input sample with the mean level to output a selection control signal; and a selector for selecting one of the first and second gray levels from said first and second mappers, respectively, according to the selection control signal.

19. A circuit for enhancing an image as claimed in claim 15, further comprising a buffer for storing the cumulative density functions calculated by said third calculating means, updating the stored cumulative density functions based on the picture unit, and providing a predetermined number of cumulative density function values to said mapping means.

20. A circuit for enhancing an image by histogram-equalizing an image signal represented by a predetermined number of gray levels in a picture unit, said circuit comprising:

first calculating means for calculating a gray level distribution of the image signal;

second calculating means for calculating a mean level of the image signal;

compensation means for calculating a compensated mean level by adding a brightness compensation value according to a predetermined correction function to the mean level based on the mean brightness of the input image;

third calculating means for dividing the gray level distribution into a predetermined number of sub-images on the mean level and calculating a cumulative density function for each sub-image;

a picture memory for delaying the image signal by a picture unit and providing an input sample;

mapping means for mapping the input sample output by said picture memory into mapped gray levels based on the sub-images, the cumulative density functions and the compensated mean level, and outputting the mapped gray levels; and outputting means for comparing the input sample with the mean level and selecting one of the mapped gray levels output by said mapping means and outputting the selected level.

21. A circuit for enhancing an image as claimed in claim 20, wherein the picture unit is a frame and the predetermined number is two.

22. A circuit for enhancing an image as claimed in claim 21, wherein said mapping means comprises:

a first mapper for mapping the input sample into a first gray level ranging from a minimum level $X_0$ to the compensated mean level $B_m$ according to a first transform function which is defined based on one of the cumulative density functions; and a second mapper for mapping the input sample into a second gray level ranging from $B_m'$ to a maximum level $X_{L-1}$ according to a second transform function which is defined based on another one of the cumulative density functions, wherein $B_m'=B_m+X_{L-1}/(L-1)$ and L is the number of gray levels.

23. A circuit for enhancing an image as claimed in claim 22, wherein said outputting means comprises:

a comparator for comparing the mean level with the input sample from said picture memory to output a selection control signal; and a selector for selecting one of the first and second gray levels from said first and second mappers, respectively, according to the selection control signal.

24. A circuit for enhancing an image as claimed in claim 20, further comprising a buffer for storing the cumulative density functions calculated by said third calculating means, updating the stored cumulative density functions based on the picture unit, and providing a predetermined number of cumulative density function values to said mapping means.

25. A circuit for enhancing an image as claimed in claim 20, wherein said brightness compensation value is a positive brightness compensation value which is greater than zero when the mean level is less than a first threshold, and is a negative brightness compensation value which is less than zero when the mean level is greater than a second threshold.

26. A circuit for enhancing an image by histogram-equalizing an image signal represented by a predetermined number of gray levels in a picture unit, said circuit comprising:

first calculating means for calculating a gray level distribution of the image signal;

second calculating means for calculating a mean level of the image signal;

compensation means for calculating a compensated mean level by adding a brightness compensation value according to a predetermined correction function to the mean level based on the mean brightness of the input image;

third calculating means for dividing the gray level distribution into a predetermined number of sub-images based on the mean level and calculating a cumulative density function for each sub-image;

mapping means for mapping an input sample of the image signal into mapped gray levels based on the sub-images, the cumulative density functions and the compensated mean level, and outputting the mapped gray levels; and outputting means for comparing the input sample with the mean level and selecting one of the mapped gray levels output by said mapping means and outputting the selected level.

27. A circuit for enhancing an image as claimed in claim 26, wherein the picture unit is a frame and the predetermined number is two.

28. A circuit for enhancing an image as claimed in claim 27, wherein said mapping means comprises:

a first mapper for mapping the input sample into a first gray level ranging from a minimum level $X_0$ to the compensated mean level $B_m$ according to a first transform function which is defined based on one of the cumulative density functions; and a second mapper for mapping the input sample into a second gray level ranging from $B_m'$ to a maximum level $X_{L-1}$ according to a second transform function which is defined based on another one of the cumulative density functions, wherein $B_m'=B_m+X_{L-1}/(L-1)$ and L is the number of gray levels.

29. A circuit for enhancing an image as claimed in claim 28, wherein said outputting means comprises:

a comparator for comparing the mean level with the input sample to output a selection control signal; and a selector for selecting one of the first and second gray levels from said first and second mappers, respectively, according to the selection control signal.

30. A circuit for enhancing an image as claimed in claim 26, further comprising a buffer for storing the cumulative density functions calculated by said third calculating means, updating the stored cumulative density functions based on the picture unit, and providing a predetermined number of cumulative density function values to said mapping means.

31. A circuit for enhancing an image as claimed in claim 26, wherein said brightness compensation value is a positive brightness compensation value which is greater than zero when the mean level is less than a first threshold, and a negative brightness compensation value which is less than zero when the mean level is greater than a second threshold.

32. An image enhancing circuit in which an input image signal expressed as a predetermined number (L) of gray levels is histogram-equalized, said circuit comprising:

first calculating means for calculating a gray level distribution in a picture unit of the input image signal;

second calculating means for calculating a mean level in the picture unit of the input image signal;

compensation means for adding a brightness compensation value according to a predetermined correction function to the mean level based on a mean brightness of the input image, and outputting a compensated mean level;

third calculating means for dividing the gray level distribution into a predetermined number of sub-images according to the mean level and calculating a cumulative density function for each sub-image;

mapping means for mapping a sample of the input image to mapped gray levels according to the cumulative density functions and the compensated mean level, and outputting the mapped gray levels; and outputting means for selectively outputting one of the mapped gray levels output from said mapping means as an enhanced signal, according to a result obtained by comparing the input image signal and the mean level.

33. A circuit for enhancing an image as claimed in claim 32, wherein said mapping means comprises:

a first mapper for mapping a sample of the input image signal which is equal to or less than the mean level to a gray level ranging from a minimum level $X_0$ to a compensated mean level $B_m$ according to a corresponding cumulative density function value of the input image signal; and a second mapper for mapping a sample of the input image signal which is greater than the mean level to a gray level ranging from $B_m'$ to a maximum level $X_{L-1}$ according to a corresponding cumulative density function value of the input image signal, wherein $B_m' = B_m + X_{L-1}/(L-1)$.

34. A circuit for enhancing an image as claimed in claim 33, wherein said outputting means comprises:

a comparator for comparing the level of the input image signal with the mean level and outputting a selecting control signal; and a selector for selecting an output of one of said first and second mappers according to the selecting control signal.

35. A circuit for enhancing an image as claimed in claim 32, further comprising a buffer for updating said cumulative density functions and providing previously stored cumulative density functions to said mapping means.

36. A circuit for enhancing an image as claimed in claim 32, wherein said brightness compensation value is a positive brightness compensation value which is greater than zero when the mean level is very small corresponding to the input image being very dark, and is a negative brightness compensation value which is less than zero when the mean level is very large corresponding to the input image being very bright, said compensation means outputting a compensated mean level by which the brightness of the enhanced signal is controlled.

37. A circuit for enhancing an image as claimed in claim 32, wherein said picture unit is a frame and the predetermined number of sub-images is two.

38. A circuit for enhancing an image by histogram-equalizing an image signal represented by a predetermined number of gray levels in a picture unit, said circuit comprising:

a first calculator receiving the image signal, calculating a gray level distribution of the image signal and outputting a gray level distribution signal;

a second calculator receiving the image signal, calculating a mean level of the image signal and outputting a mean level signal;

a third calculator which receives the gray level distribution signal and the mean level signal, divides the gray level distribution into a predetermined number of sub-images based on the mean level signal and calculates a cumulative density function for each sub-image and outputs cumulative density function signals representing the calculated cumulative density functions;

a mapping unit receiving the mean level signal, the cumulative density function signals and the image signal, mapping an input sample of the image signal to a plurality of gray levels based on the cumulative density functions, and outputting mapped gray levels corresponding to the input sample; and an output unit receiving the mapped gray levels from said mapping unit, comparing the input sample with the mean level, selecting one of the mapped gray levels output by said mapping unit based on the comparison and outputting the selected gray level.

39. A circuit for enhancing an image as claimed in claim 38, wherein the picture unit is a frame and the predetermined number is two.

40. A circuit for enhancing an image as claimed in claim 39, wherein said mapping unit comprises:

a first mapper for mapping the input sample into a first gray level ranging from a minimum level $X_0$ to the mean level $X_m$ by using a first transform function which is defined based on one of the cumulative density functions; and a second mapper for mapping the input sample into a second gray level ranging from a level $X_{m+1}$ which is next to the mean level to a maximum level $X_{L-1}$ by using a second transform function which is defined based on another one of the cumulative density functions.

41. A circuit for enhancing an image as claimed in claim 40, wherein said outputting unit comprises:

a comparator for comparing the input sample with the mean level to output a selection control signal; and a selector for selecting one of the first and second gray levels from said first and second mappers, respectively, according to the selection control signal.

42. A circuit for enhancing an image as claimed in claim 38, further comprising a buffer for storing the cumulative density functions calculated by said third calculator, updating the stored cumulative density functions based on the picture unit, and providing a predetermined number of cumulative density function values to said mapping unit.

43. A circuit for enhancing an image as claimed in claim 38, further comprising a brightness compensator which receives the mean value signal and calculates a compensated mean level by adding to the mean level a brightness compensation value determined according to a predetermined correction function and based on the mean brightness of the input image, and outputs a compensated mean level signal representing the compensated mean value, wherein said mapping unit receives the compensated mean value signal and operates based on the compensated mean level.

44. A circuit for enhancing an image as claimed in claim 38, further comprising a picture memory for delaying the image signal by a picture unit and outputting an input sample to said mapping unit and said outputting unit for use as the image signal.

45. A circuit for enhancing an image as claimed in claim 38, wherein said mapping unit performs mapping based on cumulative density functions and sub-images calculated for a picture prior to a current picture.

* * * * *